March 5, 1940.  R. PUDELKO  2,192,329
ELECTRIC CLOCK
Filed Sept. 15, 1934
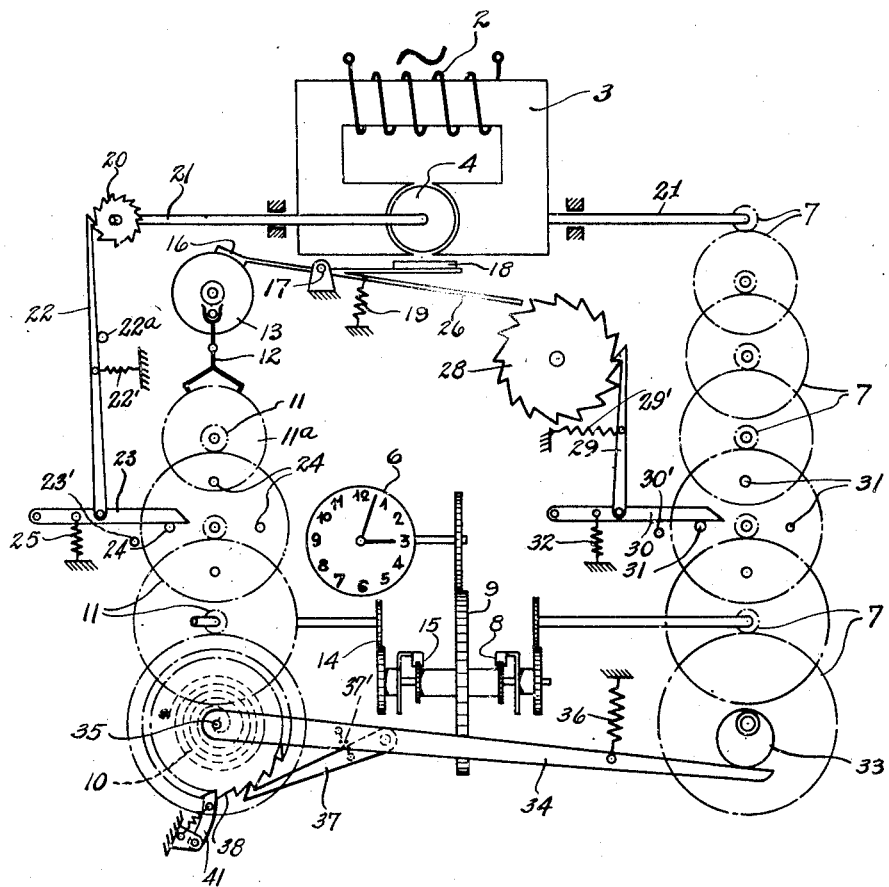
INVENTOR
Riccard Pudelko
BY
Morgan Finnegan and Durham
ATTORNEYS Patented Mar. 5, 1940

2,192,329

UNITED STATES PATENT OFFICE 2,192,329

ELECTRIC CLOCK

Riccard Pudelko, Zug, Switzerland, assignor to Landis & Gyr, A.-G., a corporation of Switzerland Application September 15, 1934, Serial No. 744,106
In Switzerland September 22, 1933

4 Claims. (Cl. 58—26)

The present invention relates to electric clocks and more particularly to a novel and improved electric clock which will operate continuously regardless of interruptions in the power supply.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrates one embodiment of the invention, and together with the description, serves to explain the principles of the invention.

Of the drawing:

The single figure of the drawing is a diagrammatic showing of an illustrative embodiment of the present invention, the clock being driven by the synchronous motor.

The present invention has for its object the provision of a novel and improved electric clock which will operate during periods when the power supply is interrupted. A further object is the provision of an electric clock employing a non-self-starting synchronous motor which is automatically started and again placed in operation after restoration of the power supply. Another object is the provision of an electric clock of the type in which an auxiliary spring movement is provided for alternatively operating the hands on failure of the electric power, and in which only a small escapement movement need be used and which serves to restore the clock to its normal operation as soon as the power supply is restored.

In accordance with the illustrative embodiment of the present invention, the hands of the electric clock are normally driven through reduction gearing from a synchronous motor which is of the non-self-starting type. An escapement clock mechanism, capable of running for a relatively short period such as a few hours, is also provided and may drive the clock hands on stoppage of the motor. Means are provided for holding the escapement against movement until the power supply is interrupted and after the motor has been restored to its normal operation, and this escapement movement also serves to impart rotational impulses to the synchronous motor to again set it in rotation after restoration of the power supply. The synchronous motor is preferably arranged to maintain the escapement movement spring in a wound condition, and other means are provided for restoring the escapement stopping means to its normal position after the synchronous rotor has been started after restoration of the power supply.

Thus, in the operation of the present embodiment, the synchronous rotor normally drives the clock hands and maintains the escapement movement spring fully wound. Upon cessation of the power supply, the escapement is set in operation to drive the clock hands and also to impart periodic impulses to the synchronous rotor. As soon as the power supply has been restored, the synchronous rotor rotates at its synchronous speed, and this rewinds the escapement movement spring and restores the escapement holding means to its normal position to stop the movement.

It will be understood that the foregoing general description and the following detailed description as well, are exemplary and explanatory of the invention but are not restrictive thereof.

Referring now in detail to the illustrative embodiment of the invention as shown by the accompanying drawing, the non-self-starting synchronous motor comprises a magnet coil 2, supplied with alternating current of suitable regulated frequency and voltage, and its magnet core 3, between the poles of which is rotatably mounted the synchronous rotor 4.

The hands mechanism, or other device to be operated by the clock mechanism, may be of conventional construction and is designated by the numeral 6, being driven from the rotor 4 through reduction gearing 7 and the overrunning clutch 8 on one side of the drive gear 9. The reduction gearing is so proportioned to the speed of the rotor that the hands are rotated at the proper speeds to indicate the correct time.

Means are also provided for driving the hands mechanism by means of an escapement clock movement whenever the synchronous rotor is stopped by reason of power failure, and for this purpose an escapement movement is provided comprising the spring 10, gearing 11, escape wheel 11a, escapement lever 12 and balance wheel 13, connected to the hands mechanism 6 through gearing 14 and the overrunning clutch 15 on the other side of gear 9. This escapement mechanism is normally held inoperative, and remains inoperative so long as power is supplied to the magnet 2, 3, by means of the brake 16 bearing against the balance wheel 13. Brake 16 is pivoted at 17 and is provided with an armature 18 to be attracted by the stray field produced by the magnet 2, 3, and is urged away from its stopping position by means of tension spring 19. When there is a failure of power supplied to the magnet coil 3, the armature is released and spring 19 moves the brake 16 away from the balance wheel 13, permitting the escapement to drive the clock hands 6.

The clutches 8 and 15 permit the synchronous rotor or escapement to drive the hands mechanism alternatively without interference with each other.

For periodically imparting rotational impulses to the rotor 4, a ratchet 20 is mounted on the rotor shaft 21 and cooperates with a pawl 22 biased by spring 22' which is connected to lever 23 and is periodically oscillated by rotation of the pins 24 mounted on the escapement controlled gearing. Pawl 22 is limited in its movement to the right by stop 22a. A spring 25 is provided for pulling the pawl downwardly with a quick stroke, the pawl is lifted by the pins 24, and in this manner, rotation of the gearing tends to start the rotor 4, so that as soon as the power supply is restored the rotor 4 is again placed in normal operation.

Means are provided for restoring the brake 16 to its normal position of stopping oscillation of the balance wheel 13, soon after the restoration of the power supply, and for this purpose armature 18 is provided with an arm 26 which is raised by means of the toothed wheel 28, thereby raising the armature into the influence of the magnetic field around the magnet core 3 after which the magnet raises the armature 18 further and into balance wheel stopping position. The toothed wheel 28 is driven from the gearing 7 by means of the pawl 29, which is pivoted to arm 30 and biased by spring 29' which is lifted by pins 31 and is returned by means of spring 32. Levers 23 and 30 are limited in their downward movement by stop pins 23' and 30', respectively.

Means are also provided for maintaining the escapement driving spring in a fully wound condition by operation of the synchronous rotor 4, and for this purpose a cam 33 is mounted on one of the gears 7 and oscillates a lever 34 pivoted at 35 and held against the cam by means of tension spring 36. Lever 34 is provided with a pawl 37 which under the influence of spring 37' engages teeth 38 of a ratchet fixed to the shaft on which the driving spring is coiled, and as the clock in its normal operation is driven from its motor, the spring is wound. A retrograde pawl 41 is provided to hold ratchet 38 against retrograde movement during the overrunning of the pawl 37. When the spring has been fully wound, the tension of spring 36 is insufficient to return the lever 34 against its cam, thus preventing over-winding of the spring.

In the operation of the above-described embodiment, the rotor 4 drives the hands mechanism 6 through gearing 7, 8 and 9. Upon cessation of the power supply the rotor 4 ceases rotation, armature 18 is pulled away from magnet core 3 by means of spring 19 and balance wheel 13 is released, permitting the escapement movement to drive the hands mechanism 6 through gearing 11, 14 and 15. Periodically during the operation of the escapement the pins 24 raise lever 23, and as it rides off the pins 24, spring 25 returns the lever and pawl 22 to cause a quick partial rotation of the shaft 21 and rotor 4. Whenever the power supply is restored, the rotor then continues in operation and pawl 29 is operated to restore the armature 18 to its normal position where it is held in braking relation to the balance wheel 13 by means of the stray field of magnet core 3.

The invention in its broader aspects is not limited to the specific mechanisms shown and described but departures may be made therefrom within the scope of the accompanying claims without departing from the principles of the invention and without sacrificing its chief advantages.

What I claim is:

1. An electric clock including in combination a non-self-starting synchronous motor, a driven mechanism normally driven by said synchronous motor, an auxiliary movement for alternatively driving said mechanism, overrunning clutches, said motor and movement being each alternatively operably connected to the hands mechanism by said overrunning clutches, means operated by the movement for starting said motor and means operated by said motor for stopping said movement.

2. An electric clock including in combination a non-self-starting synchronous motor, a hand mechanism, a spring movement, means for alternatively driving said hand mechanism from either the motor or movement, a motor starting device periodically energized by said movement, stopping means for the movement and means for releasing the stopping means on failure of power supply and means for restoring the stopping means by operation of the motor.

3. An electric clock including in combination a non-self-starting synchronous motor, a driven mechanism normally driven by said synchronous motor, an auxiliary movement for alternatively driving said mechanism, overrunning clutches, said motor and movement being each alternatively operably connected to the hands mechanism by said overrunning clutches, means operated by the movement for starting said motor and means operated by said motor for stopping said movement, said last means including a brake actuated by the motor armature.

4. An electric clock including in combination a non-self-starting synchronous motor, a hand mechanism, a spring movement, means for alternatively driving said hand mechanism from either the motor or movement including overrunning clutches connecting said motor and movement to said hand mechanism, a motor starting device periodically energized by said movement, stopping means for the movement, means for releasing the stopping means on failure of power supply, means for restoring the stopping means by operation of the motor.

RICCARD PUDELKO.